Patented Oct. 6, 1953

2,654,726

UNITED STATES PATENT OFFICE 2,654,726

POLYSULPHONE AMINOTRIAZOLES

James Wotherspoon Fisher, Edward William Wheatley, and Geoffrey Bilson May, Spondon, near Derby, England, assignors to British Celanese Limited, a company of Great Britain No Drawing. Application June 9, 1950, Serial No. 167,264. In Great Britain July 11, 1949

2 Claims. (Cl. 260—78.4)

This invention relates to improvements in polymeric materials and in processes for their production.

U. S. Patent No. 2,512,667 describes the production of nitrogen-containing polymers from dihydrazides of dicarboxylic acids in presence of hydrazine, e. g. 10% by weight of the dihydrazide, over and above that combined in the dihydrazide and also describes using dicarboxylic esters with an amount of hydrazine in excess of two moles for each mole of dicarboxylic ester. U. S. Patent No. 2,512,600 describes the production of such polymers from hydrazine and the dicarboxylic acids themselves or their anhydrides or nitriles, again using more than two moles of hydrazine.

U. S. Patent No. 2,512,631 describes the production of such polymers by first heating a dicarboxylic acid or an ester thereof with an amount of hydrazine, free or combined with the acid, equal to 1–2 moles for each mole of dicarboxylic acid, continuing the reaction until a polymer is produced (this polymer contains a substantial proportion of hydrazide or 1.3.4-oxidazole links and is hydrolysable), and thereafter heating the polymer with hydrazine until there is produced a polymer resistant to hydrolysis.

Polymers may be produced according to the processes of the specifications which possess characteristics, including resistance to degenerative hydrolysis by boiling hydrochloric acid, indicating that they contain the 1.2.4-triazole nucleus repeated along the main polymer chain.

Further, according to U. S. application S. No. 170,956 filed June 28, 1950, corresponding to United Kingdom application No. 17,989/49 filed July 7, 1949, similar non-hydrolysable polymers may be produced using only two moles of hydrazine, combined or uncombined, to each mole of dicarboxylic acid, provided that the polymerisation is carried out in presence of water vapour and/or provided that the liquid contents of the pressure vessel used for the polymerisation are sufficient to leave only a comparatively small vapour space above the reagents, for example a vapour space amounting to 40% or less of the total volume of the vessel.

We have found that very valuable polymers in this series are those containing sulphone groups between successive triazole rings or aminotriazole rings, and the invention includes such polymers as well as methods of producing them. The preferred polymers are those in which there is one sulphone group between each two triazole or aminotriazole rings and more than two carbon atoms between the triazole or aminotriazole ring and the sulphone group. Preferably such carbon atoms are in the form of methylene groups.

The new polysulphone triazoles or polysulphone aminotriazoles may be produced by any of the methods described in the above-mentioned specifications using the appropriate sulphone dicarboxylic acid or derivative thereof. Generally such processes consist of heating the dicarboxylic acid and hydrazine, or any mixture which on hydrolysis will yield the dicarboxylic acid and hydrazine, the hydrazine being present in a sufficient proportion to yield a polymer which is resistant to hydrolysis by hydrochloric acid. Suitable sulphone dicarboxylic acids for this are sulphone-$\gamma.\gamma'$-dibutyric acid, sulphone-$\delta.\delta'$-divaleric acid, sulphone-$\epsilon.\epsilon'$-dicaproic acid and sulphone-$\zeta.\zeta'$-diheptoic acid and the like. As already indicated, it is preferable not to use sulphone dicarboxylic acids which contain two carbon atoms between the sulphone group and a carboxylic group or between two sulphone groups except the carbon atom $\beta$ to the sulphone group be a tertiary carbon atom, as for instance a carbon atom carrying two methyl groups. This is because polymers formed from such sulphone dicarboxylic acids tend to be thermally unstable.

A second method of producing the new polysulphone triazoles or polysulphone aminotriazoles is by oxidation of the corresponding polythioether triazoles or polythioether aminotriazoles. Preferably the oxidation is carried out by means of hydrogen peroxide or a substance yielding hydrogen peroxide while the thio-polymer is in solution in a lower fatty acid of a high concentration. While both acetic acid and propionic acid may be used, we find that better results are obtained by using formic acid, for example an aqueous formic acid of 70–95% strength, or by using a mixture of formic acid and acetic acid of high concentration, for example a mixture of the two acids containing upwards of 40% of formic acid and diluted with a small quantity of water, e. g. up to 25% of water based on the combined weights of the two acids. A convenient mixture to use is that obtained by adding to 85% aqueous formic acid the calculated quantity of acetic anhydride to combine with the 15% of water therein and then adding the desired amount of hydrogen peroxide in aqueous solution, e. g. at 30–50% concentration.

Owing to the high concentration of formic acid in such an oxidation mixture there is the possibility, particularly when using very high concentrations of formic acid containing very little water, of formylating the exocyclic amino groups along the polymer chain. In such a case the oxidised polymer may be subjected to a hydrolysis treatment with a view to removing such formyl groups if this is desired. Such hydrolysis may be carried out with mineral acids, for example hydrochloric acid or sulphuric acid, for example in concentrations of 20–40%, or may be carried out with aqueous caustic soda or other alkali. As an alternative to using hydrogen peroxide for the oxidation, addition products thereof, such as the solid sodium carbonate addition product $2Na_2CO_3.3H_2O_2$, may be used.

The polythioether aminotriazoles used as starting materials for this process of the present invention may be made by any of the methods of the four specifications previously referred to, using the appropriate thiadicarboxylic acid or a derivative thereof. As suitable acids we may mention 5-thia-azelaic acid, 5-thia-nonane-1.9-dicarboxylic acid, dibenzyl-thioether-4.4'-dicarboxylic acid, $a.\omega$-bis-(phenyl-thio)-alkane-4.4'-dicarboxylic acids, for example $a.\beta$-bis-(phenyl-thio)-ethane-4.4'-dicarboxylic acid and diphenyl-thioether-4.4'-dicarboxylic acid.

Generally the thia-dicarboxylic acids or sulphone dicarboxylic acids may be produced by treating an alkali metal sulphide, such as sodium sulphide, with two molecules of a halogenated carboxylic acid, nitrile or ester. For the preferred compounds an $a.\omega$-halogenated carboxylic acid or derivative thereof is used, for example $\gamma$-halogen butyric acid, $\delta$-halogen valeric acid, $\epsilon$-halogen caproic acid and $\zeta$-halogen heptoic acid. The free thia-dicarboxylic acid may be formed from the ester or nitrile so produced by simple hydrolysis. The thia-dicarboxylic acid thus produced may be oxidised to the corresponding sulphone dicarboxylic acid by any convenient means. Very good yields indeed are obtained by carrying out the oxidation in formic acid solution using hydrogen peroxide as the oxidising agent. Oxidation may, if desired, precede hydrolysis of the thia-dicarboxylic acid, ester or nitrile. An alternative method for forming sulphone-$\delta.\delta'$-divaleric acid is to add two moles of butadiene nitrile to hydrogen sulphide, as in Example 6 of U. S. Patent No. 2,527,509, then to reduce and hydrolyse the resulting product as in Example 1 of the same specification and finally to oxidise to the sulphone.

Generally the polymers obtained from the preferred aliphatic sulphone dicarboxylic acids containing only $CH_2$ groups between the sulphone group and the carboxylic groups, and between the sulphone groups themselves if more than one is present, exhibit crystallinity and have sharp melting points. If of sufficiently high molecular weight, they can be spun into filaments from the melt, as described, for example, in the prior specifications referred to. Polymers produced from other sulphone dicarboxylic acids, particularly those having side chains, generally have less sharp melting points and are of a more resinous character. They may be used for the purposes to which synthetic resins have in the past been applied.

The following examples illustrate the invention, all the parts being by weight:

*Example 1*

310 parts of 1.6-dichlorohexane, 51 parts of sodium cyanide and 1500 parts of methyl cellosolve were refluxed for 4 hours, the product cooled, filtered from salt and distilled up to 140° C. at atmospheric pressure to remove the solvent. The residue was then fractionated at 20 mms. pressure and the fraction boiling at 132–138° C. collected. It was refractionated to yield a fraction boiling at 130–132° C. at 17 mm. This represented 7-chlorheptanonitrile.

72.7 parts of the 7-chlorheptanonitrile, 46.9 parts of sodium sulphide $Na_2S.9H_2O$, 110 parts of 95% aqueous ethanol and 75 parts of water were refluxed together for 17 hours. The alcohol was removed by distillation and the residue formed two layers. After separating off the aqueous layer, the organic layer was distilled under a pressure of 20 mm. of mercury. After distillation of the unchanged chloronitrile, a friction was collected at about 270° C. This was the 7-thiatredecane-1.13-dicarboxylic acid dinitrile. It was soluble in ether, benzene and chloroform but insoluble in petroleum ether. The nitrile was refluxed with half its weight of caustic potash dissolved in twice its weight of ethylene glycol for approximately 6 hours. The mixture became homogeneous after ¾ hour. After cooling, the product was poured into water and acidified with HCl until it was slightly acid to Congo red paper. The white precipitate was filtered off and oxidised directly to the corresponding sulphone acid. For this purpose the thia-acid was suspended in formic acid and approximately twice the calculated quantity of hydrogen peroxide was added in the form of a 30% aqueous solution. The mixture was refluxed for 2 hours and the clear solution then allowed to cool. A white solid crystallised out, was filtered off, washed first with water and then with benzene and dried. The acid had a melting point of 152° C.

96.6 parts of the sulphone dicarboxylic acid were added to hot methanol. Most of the acid dissolved on boiling. A hot methanol solution containing 32 parts of 30% aqueous hydrazine was added and this gave a clear solution. On cooling, a white solid began to deposit. This was facilitated by addition of dioxane. The salt, which was a pure white solid, had a melting point of 127–128° C., was fairly soluble in cold water, readily soluble in hot water, and soluble in hot methanol. 10 parts of the salt and 6 parts by weight of 30% aqueous hydrazine were heated together in a stainless steel autoclave for 2 hours at 220° C. The maximum pressure recorded was 270 lbs. per square inch. The temperature was then raised to 260° C. and maintained for a further 2 hours, during which the maximum recorded pressure was 380 lbs. per square inch. Finally the polymer was heated to the melt under an absolute pressure of 2 mms. of mercury for 10 minutes at 240° C. The polymer thus produced had a melting point of 212° C. and showed very good fibre-forming and cold-drawing properties. Its intrinsic viscosity was about 0.43. This could be increased by further heating under the high vacuum.

*Example 2*

The free thia-dicarboxylic acid prepared as in the preceding example was converted with the aid of methanol and concentrated sulphuric acid as catalyst to its methyl ester which was a colourless oil, boiling point 252° C. at 20 mm. pressure. The ester solidified on standing to a low-melting white mass. It was converted to the dihydrazide, melting point 155–156° C., by refluxing with excess hydrazine in aqueous methanol for 2 hours. The hydrazide came out of solution during the refluxing and, after cooling, was filtered off.

10 parts of the dihydrazide (7-thiatredecane-1.13-dicarboxylic acid dihydrazide) and 6 parts of 50% aqueous hydrazine were heated in an autoclave first for 2 hours at 220° C. and then for 1 hour at 240° C., after which the pressure, which had risen to 420 lbs. per square inch, was released to 300 lbs. per square inch and heating continued for a further hour at 240° C. The product was a brittle white solid having a melting point of 180–182° C., insoluble in water and acetone, and soluble in meta-cresol and formic acid. Its sulphur content was 10.98%.

50 parts of the polythioether-aminotriazole were dissolved in 500 parts of a mixture obtained by adding to 85% aqueous formic acid the calculated amount of acetic anhydride to combine with all the water. The solution was raised to 60° C. and 30% aqueous hydrogen peroxide added in a quantity equal to twice the theoretical amount required for oxidation. The mixture was maintained at 60–70° C. for 2–3 hours to complete the oxidation. The product, a polysulphone-aminotriazole possibly containing formyl groups on the exocyclic amino groups, was then refluxed for 1 hour in N-aqueous sodium hydroxide solution and thoroughly washed. The resulting polysulphone-aminotriazole was a white solid having a melting point of 206–208° C., insoluble in water, acetone, ether, chloroform and benzene, and soluble in cresol and formic acid. Its sulphur content was 9.79%.

Example 3

508 parts of 1.4-dichlorobutane, 102 parts of sodium cyanide, 1600 parts of methanol and 300 parts of water were refluxed for 17 hours. The product when cool was poured into water and extracted repeatedly with chloroform. After drying with sodium sulphate the combined extracts were distilled at atmospheric pressure and the fraction boiling at 210–230° C. collected. This represented the 4-chlorvaleronitrile.

107.5 parts of the chlorvaleronitrile, 98 parts of sodium sulphide $Na_2S.9H_2O$, 367 parts of 95% aqueous ethanol and 200 parts of water were refluxed for 16 hours. The alcohol was then distilled off, the residue diluted with water and extracted repeatedly with chloroform. After removing the solvent at atmospheric pressure and the unchanged chlornitrile at a pressure of 30 mm. of mercury and a temperature up to 200° C., the residue, a pale amber coloured oil, was refluxed for 19 hours with six times its weight of 8% aqueous caustic soda. The product was cooled, filtered from a little solid material and the filtrate acidified with hydrochloric acid until just acid to Congo red. The white precipitate was then filtered off, washed and dried. It had a melting point of 94–96° C. which on recrystallisation rose to 100° C., the equivalent weight being 116.9. 39.6 parts of the thio-bis-valeric acid were refluxed with 77 parts of 100 volume hydrogen peroxide (100% excess) in formic acid solution for 2 hours. On cooling, a white crystalline solid was obtained which was filtered, washed with water and dried. It had a melting point of 182–183° C.

The acid was then converted in the usual way first to the methyl ester, melting point 66–68° C., and then by refluxing with excess hydrazine in methanol solution to the hydrazide, melting point 160–162° C. 7.3 parts of the sulphone-bis-valeric dihydrazide and 5 parts of 60% aqueous hydrazine were heated for 3 hours at 200–210° C., during which a maximum pressure of 280 lbs. developed, and the temperature was then raised to 220–230° C. for an hour, during which a pressure of 550 lbs. per square inch was recorded. The pressure was then released over ¼ hour to 300 lbs. per square inch and maintained at this value for ½ hour at 220–230° C. The product was a white powdery solid, melting point 220–225° C., having fibre-forming properties. It was insoluble in water and methanol and soluble in cresol and formic acid. Its sulphur content was 12.77%.

Example 4

117 parts of the thiodivaleric acid (5-thia-nonane-1.9-dicarboxylic acid) prepared as in Example 3 and 96 parts of 60% aqueous hydrazine were heated in an autoclave for 2 hours at 140° C., then for 1 hour at 200° C. and finally for 1½ hours at 220° C., the autoclave remaining closed throughout and no pressure release being permitted. The product was a white powdery solid having a melting point of 150–155° C., and was capable of forming long fine filaments. It was insoluble in water, acetone, chloroform and benzene, and soluble in cresol and formic acid. Its sulphur content was 14.0%.

50 parts of the polythioether-aminotriazole were dissolved in 500 parts of a mixture obtained by adding to 85% aqueous formic acid the calculated amount of acetic acid anhydride to combine with all the water. The solution was raised to 60° C. and 30% aqueous hydrogen peroxide added in a quantity equal to twice the theoretical amount required for oxidation. The mixture was maintained at 60–70° C. for 2–3 hours to complete the oxidation. The product, a polysulphone-aminotriazole, was then refluxed for 1 hour in N-aqueous sodium hydroxide solution and thoroughly washed. The polymer was a white solid having a melting point of 208–210° C. and gave filaments from the melt.

Example 5

70 parts of γ-butyrolactone and 55 parts of sodium sulphide $Na_2S$ were heated together to 120° C. A vigorous reaction occurred and the product completely solidified after about 5 minutes. The solid was cooled, dissolved in water, acidified with hydrochloric acid until acid to Congo red, and the resulting solution repeatedly extracted with chloroform and the chloroform distilled off from the combined extracts. Recrystallisation of the residue from benzene gave thio-bis-butyric acid (5-thia-azelaic acid), melting point 90° C. and equivalent weight 103.4. 18.5 parts of the thio-bis-butyric acid were oxidised in formic acid by means of 45 parts of 100 volume hydrogen peroxide and the mixture refluxed for 3 hours. The product was filtered and on cooling a white crystalline solid separated. This was filtered off, washed with water and dried. It had a melting point of 194–196° C.

The sulphone-bis-butyric acid was then converted as before to the dimethyl ester, melting point 61–62° C., and by refluxing with excess aqueous hydrazine in methanol solution the dihydrazide was formed, melting point 186° C.

8 parts of the sulphone-bis-butyric acid dihydrazide and 5 parts of 60% aqueous hydrazine were heated in an autoclave for 2 hours at 200° C., during which the maximum pressure recorded was 220 lbs. per square inch, and the pressure was then released to 150 lbs. per square inch and the autoclave maintained for a further 2 hours at that pressure and 200° C. The product was a granular solid, melting point 258–260° C., and sulphur content 13.8%.

Example 6

10.3 parts of the free thiodibutyric acid prepared as in Example 5 and 3.2 parts of 50% aqueous hydrazine (equimolecular proportion) were dissolved in separate portions of methanol and the solutions mixed. Ether was then added which caused the salt to separate as a viscous syrup. The syrup was heated under nitrogen for 2 hours at 170–175° C. The material polymerised to a light opaque mass which, having regard to the proportions of hydrazine used, represented the polyhydrazide. This product was then heated in an autoclave with 6 parts of 60% aqueous hydrazine at 200° C. for 3½ hours. The maximum pressure recorded was 300 lbs. per square inch. The product, which represented the polythioether-aminotriazole, had a melting point of 160–165° C. and sulphur content 15.83%.

This polythioether-aminotriazole was dissolved in glacial acetic acid and the solution heated to 60° C. There was then added 30% aqueous hydrogen peroxide in an amount twice that necessary to convert all the thia linkages to sulphone linkages. After ½ hour the solution was cooled, diluted and neutralised with aqueous ammonia. The polymer was precipitated as a white powder, melting point 230–235° C., insoluble in methanol. Sulphur content 13.86%.

Having described our invention, what we desire to secure by Letters Patent is:

1. Process for the production of a polysulphone-aminotriazole, which comprises heating a dihydrazide of a sulphone dicarboxylic acid, whose carboxylic groups are its sole reactive groups and in which sulphone and carboxylic groups are separated from each other by at least three methylene groups, together with sufficient hydrazine to yield a polymer resistant to hydrolysis by hydrochloric acid, and continuing the heating until such polymer is produced.

2. Process according to claim 1, wherein the heating is continued until a fibre-forming polymer is produced.

JAMES WOTHERSPOON FISHER.
EDWARD WILLIAM WHEATLEY.
GEOFFREY BILSON MAY.

References Cited in the file of this patent

UNITED STATES PATENTS

| Number | Name | Date |
|---|---|---|
| 2,191,556 | Carothers | Feb. 27, 1940 |
| 2,201,884 | Carothers | May 21, 1940 |
| 2,512,601 | Bates | June 27, 1950 |
| 2,534,347 | Fisher | Dec. 19, 1950 |
| 2,571,251 | Jones | Oct. 16, 1951 |

FOREIGN PATENTS

| Number | Country | Date |
|---|---|---|
| 612,609 | Great Britain | Nov. 16, 1948 |
| 889,303 | France | Sept. 27, 1943 |